United States Patent Office 3,523,331
Patented Aug. 11, 1970

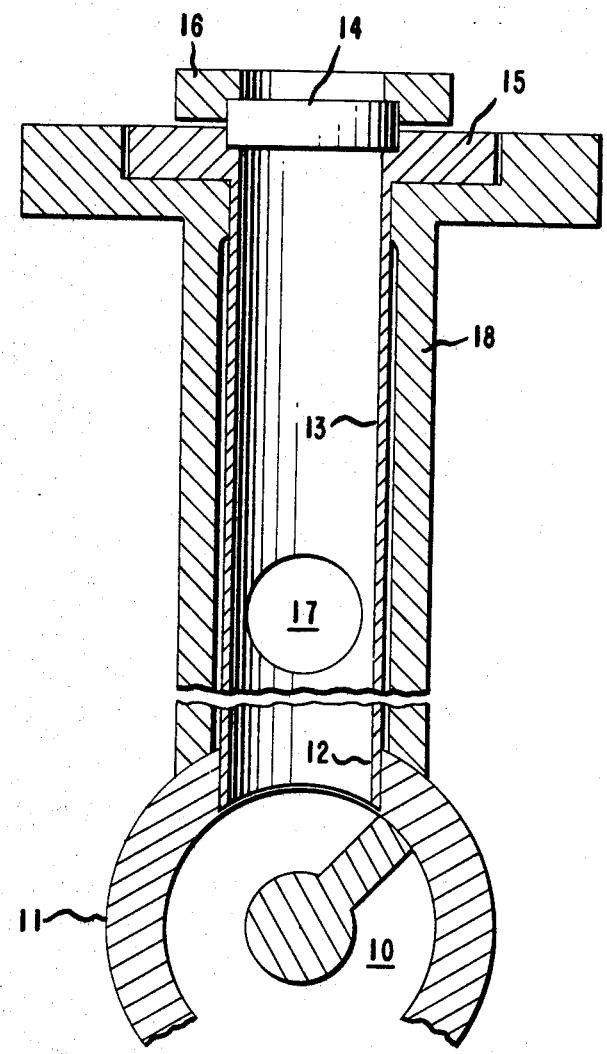

3,523,331
HEATED EXTRUSION VENT PORT MONITORING WINDOW
Robert Benjamin Weeks, Willowdale, Ontario, Canada, assignor to Du Pont of Canada, Limited, West Montreal, Quebec, Canada, a company of Canada
Filed July 30, 1968, Ser. No. 748,848
Int. Cl. B29f 3/03
U.S. Cl. 18—12                                    7 Claims

ABSTRACT OF THE DISCLOSURE

An inspection system for monitoring nylon extrusion processes which includes a vent port, a vent port tube with one end seated in said vent port and a sight glass at the other end of said vent port tube and a vacuum port in the side of said vent port tube can be improved so that the inspection window will not be deposited with monomer over the inside and thus rendered totally opaque by heating the inspection window and vent port tube above the condensation temperature of the monomer gases and placing said inspection window at a distance of at least 3½ times the said vent port tube's inside diameter from said vent port and having said vacuum port located at a distance of at least 2 times said vent port tube inside diameter from said sight glass.

---

This invention relates generally to monitoring nylon extrusion processes and, in particular, to an inspection window in the vent port of an extrusion apparatus for nylon.

In the process of preparing nylon polymer in an extrusion apparatus, it is known to provide vent ports at points throughout the length of the extrusion apparatus through which gases formed by vaporization of moisture and low molecular weight monomer may escape. These ports are usually provided on the upstream side of a highly compressive or choke section of the extrusion device to prevent molten polymer from rising up into the port. However, due to occasional upsets in the process, material does build up in the port until the port eventually becomes blocked with degraded and caked polymer and has to be changed.

A sleeve may be fitted in the vent port of the type described in Canadian Ser. No. 973,082, filed Oct. 14, 1966, to S. D. Wood which is easily removable for cleaning; however, a problem occurs in knowing when it is necessary to remove and clean the vent port sleeve. One method used is to continuously monitor the temperature of the exhaust gases in the port with a thermocouple inserted in the port. When polymer enters the port during process upsets, it surrounds the tip of the thermocouple, a change in temperature occurs at the tip and an indication of the upset is thereby generated. Although the tip of the thermocouple is surrounded by polymer, the vent port may only be partially blocked and in many cases, the sleeve is removed for cleaning when it is not necessary. Thus the process is affected and additional maintenance is carried out unnecessarily.

Although the use of inspection windows has been used in the past with some processes, when tried with nylon, the inspection windows become deposited with monomer over the inside and totally opaque.

It has surprisingly been found that this problem may be overcome by the combination of keeping the inspection windows heated above the condensation temperature of the monomer gases and at a minimum distance away from the stream of exhaust gases.

One object of this invention is to locate an inspection window on a nylon extrusion device so that it remains transparent for long periods.

With this and other objects in view, there is provided in an extrusion device for nylon polymer which includes a vent port, a vent port tube with one end seated in said vent port and a vacuum port in the side of said vent port tube, the improvement comprising: a sight glass located at the end of said vent port tube at a distance of at least three and a half times the vent port tube inside diameter from said vent port, said vacuum port located at least twice said vent port tube inside diameter from said sight class, and means for heating said vent port tube and said sight glass to a temperature above the condensation temperature of the exhaust gases in said vent port.

These and other objects of the present invention will become evident from the more detailed description set forth below, it being understood that such more detailed description is given by way of illustration and explanation only and not by way of limitation, since various changes therein may be made by those skilled in the art without departing from the scope or spirit of the present invention.

In connection with that more detailed description:

The figure is a cross-sectional view through a vent port tube on an extrusion apparatus.

Referring now in detail to the drawing, the extrusion apparatus chosen for purposes of illurstation has a screw 10 which rotates in a barrel 11. A vent port 12 in the barrel 11 holds a tube or liner 13, one end of which extends into close proximity with the screw 10, and at the other end, is a sight glass 14 held in an insert flange 15 by a retainer plate 16. It has been found that the length of the tube or liner 13 should be at least three and a half times the inside diameter of the tube or liner 13 with preferred distance of at least eight times the inside diameter. A vacuum port 17 is located in the side of the tube or liner 13, at a distance from the sight glass 14 of at least twice the inside diameter of the tube or liner 13 with a preferred distance of at least three times the inside diameter. A heated jacket 18 surrounds the tube or liner 13 and heats the insert flange 15 and the sight glass 14 as well as the tube or liner 13.

In operation, nylon polymer, usually in the flake form, is introduced into the entrance to the extrusion device. The polymer is melted due to adiabatic heating in the first compression section. The molten polymer then passes to the intermediate section of the extrusion device where less presure exists and any volatile materials are vaporized. The first vent port is located in the intermediate section. All further vent ports are located where there is little or no pressure. A vacuum is applied to the vacuum port 17 to assist in the removal of this vapour. Some vaporized monomer is included in this vapour, and it has been found that in order to stop the monomer condensing on the walls of the tube or liner 13, the temperature must be kept above the condensation temperature of the vaporized monomer. In the case of hexamethylene adipamide, this is 160° C., and the preferable temperature range is between 165° C. and 350° C. Furthermore, to keep the sight glass transparent, it has been found that the sight glass must be kept out of the stream of the exhaust gases at a distance of at least twice the inside diameter of a tube or liner and preferably three times the inside diameter.

Periodic upsets occur in the process causing molten polymer to rise into the tube or liner 13. However, by keeping the sight glass 14 heated and out of the stream of exhaust gases, the sight glass 14 retains its transparency for long periods of process operation without having to be cleaned, and the operator is able to detect the polymer build up and determine when it is time to change the sleeve or remove the caked polymer from the tube.

What is claimed is:

1. In an extrusion device for nylon polymer which includes a vent port, a vent port tube with one end seated in said vent port and a vacuum port in the side of said vent port tube, the improvement comprising: a sight glass located at the end of said vent port tube at a distance of at least three and a half times the vent port tube inside diameter from said vent port, said vacuum port located at least twice said vent port tube inside diameter from said sight glass, and means for heating said vent port tube and said sight glass to a temperature above the condensation temperature of the exhaust gases in said vent port.

2. The improvement according to claim 1 wherein said sight glass is located at a distance of at least eight times the vent port tube inside diameter from said vent port, and said vacuum port is at least three times said vent port tube inside diameter from said sight glass.

3. In a screw extruder for nylon polymer which includes: a barrel, a vent port, a vent port housing projecting from said barrel, a tubular liner inside said vent port housing and vacuum port in the side of said liner, the improvement comprising: a sight glass located at the end of said tubular liner at a distance of at least three and a half times the tubular liner inside diameter from said barrel, said vacuum port located at least twice said tubular liner inside diameter from said sight glass, and a heating jacket surrounding said liner adapted to heat said liner and said sight glass to a temperature above the condensation temperature of the exhaust gases in said vent port.

4. The improvement of claim 1 wherein the nylon polymer is hexamethylene adipamide and the inside of said vent port tube and said sight glass are kept within the range 165° C. to 350° C.

5. The improvement of claim 2 wherein the nylon polymer is hexamethylene adipamide and the inside of said vent port tube and said sight glass are kept within the temperature range of 165° C. to 350° C.

6. The improvement of claim 3 wherein the nylon polymer is hexamethylene adipamide and the inside of said vent port tube and said sight glass are kept within the temperature range of 165° C. to 350° C.

7. In a device for extruding nylon polymer which includes: a barrel, a vent port for removing low molecular weight monomer, a vent port housing projecting from said barrel, a tubular liner inside said vent port housing and a vacuum port in the side of said liner, the improvement comprising: a sight glass located at the end of said tubular liner at a distance of at least three and a half times the tubular liner inside diameter from said barrel, said vacuum port located at least twice said tubular liner inside diameter from said sight glass, and a heating jacket surrounding said liner adapted to heat said liner and said sight glass to a temperature above the condensation point of said monomer.

References Cited

UNITED STATES PATENTS

| | | |
|---|---|---|
| 1,478,842 | 12/1923 | Staley. |
| 2,434,707 | 1/1948 | Marshall. |
| 3,158,900 | 1/1964 | Heston. |
| 3,350,742 | 11/1967 | Wood. |

WILLIAM J. STEPHENSON, Primary Examiner